United States Patent [19]
Fujii

[11] Patent Number: 5,211,899
[45] Date of Patent: May 18, 1993

[54] PROCESS FOR PRODUCTION OF POLYPROPYLENE SHEETS OR FILMS

[75] Inventor: Atsushi Fujii, Himeji, Japan

[73] Assignee: Idemitsu Petrochemical Co., Ltd., Tokyo, Japan

[21] Appl. No.: 773,341

[22] Filed: Oct. 7, 1991

[30] Foreign Application Priority Data

Oct. 23, 1990 [JP] Japan .................. 2-283359

[51] Int. Cl.$^5$ ............................. B29C 47/90
[52] U.S. Cl. .................. 264/180; 264/210.2; 264/210.5; 264/235; 264/280; 264/346; 425/71
[58] Field of Search ........... 264/178 R, 180, 179, 264/346, 280, 235, 210.2, 210.5; 425/71, 378.1, 379.1, 325

[56] References Cited

U.S. PATENT DOCUMENTS

| | | |
|---|---|---|
| 3,345,447 | 10/1967 | Grant .................. 264/178 R |
| 3,383,375 | 5/1968 | van der Vegt et al. .......... 264/346 |
| 4,548,778 | 10/1985 | Fujii .................. 425/379.1 |
| 4,832,770 | 5/1989 | Nojiri et al. .......... 425/325 |
| 4,863,653 | 9/1989 | Takubo et al. .......... 425/71 |
| 4,925,379 | 5/1990 | Boorelier .......... 425/378.1 |

FOREIGN PATENT DOCUMENTS

| | | | |
|---|---|---|---|
| 58-173621 | 10/1983 | Japan | .................. 264/178 R |
| 59-57720 | 4/1984 | Japan | .................. 264/180 |
| 60-236719 | 11/1985 | Japan | . |
| 60-240431 | 11/1985 | Japan | .................. 264/178 R |
| 61-130018 | 6/1986 | Japan | .................. 264/178 R |
| 62-42822 | 2/1987 | Japan | . |
| 62-10816 | 3/1987 | Japan | . |
| 62-146611 | 6/1987 | Japan | .................. 264/180 |
| 62-41457 | 9/1987 | Japan | . |

*Primary Examiner*—Jeffery Thurlow
*Attorney, Agent, or Firm*—Frishauf, Holtz, Goodman & Woodward

[57] ABSTRACT

A process for producing a polypropylene resin sheet or film by introducing a polypropylene resin in a film form, which has been extruded from a T-die in a molten state, into a slit through which cooling water is flowing, passing the polypropylene resin film between nip rolls, and pressing the obtained sheet or film from both sides thereof under a pressure of at least 5 kg/cm$^2$, while heating at a temperature of 155° to 160° C., by the use of a metal belt having a surface roughness of not more than 0.1 μm. The process produces a sheet or film of a polypropylene resin which is unstretched and is excellent in transparency, surface gloss and heat moldability.

11 Claims, 2 Drawing Sheets

PROCESS FOR PRODUCTION OF POLYPROPYLENE SHEETS OR FILMS

BACKGROUND OF THE INVENTION

The present invention relates to a process for production of polypropylene sheets or films which are of high transparency although not stretched and thus which are suitable for use in wrapping of foodstuffs, medicines and so forth.

Sheets or films made of crystalline thermoplastic resins, such as polypropylene, are varied in physical properties such as transparency depending on the crystal form thereof.

In order to improve transparency of crystalline thermoplastic resin sheets or films, various techniques for controlling the crystallization by rapid cooling (Japanese Patent Publication Nos. 41457/1987 and 10816/1987, Japanese Patent Application Laid-Open Nos. 42822/1987 and 236719/1985, etc.), have been proposed and have been put into practical use.

In recent years, sheet products have been required to have increased in quality and productivity.

In the production of sheets having a thickness of 0.2 mm, for example, in accordance with the above methods, if the film-forming speed is increased to more than 20 m/sec, particularly more than 30 m/sec, the transparency of the sheet is gradually decreased. This is considered due to the formation of shark skin in the sheet surface with an increase of die shear stress.

From a viewpoint of the increase of productivity, sheets or films free from the decrease of transparency even at a film-forming speed of more than 20 m/sec, particularly more than 30 m/sec are desirable.

In accordance with the conventional methods, when the thickness of the sheet is more than 0.6 mm, the limit of conduction of heat in the thickness direction causes a problem that the transparency is decreased abruptly.

Under such circumstances, sheets which are of high transparency although of high thickness have been desired.

In accordance with methods other than the aforementioned methods, which have heretofore been proposed, e.g., a roll method and a method in which a nucleating agent is added, the transparency itself is poor irrespective of the film-forming speed and the thickness of the sheet.

SUMMARY OF THE INVENTION

The object of the present invention is to provide a process for efficiently producing sheets or films which are excellent in transparency and gloss although they have a high thickness.

The present invention relates to a process for producing a polypropylene sheet or film which comprises introducing a polypropylene resin in a film form, which has been extruded from a T-die in a molten state, into a slit through which cooling water is flowing, passing the polypropylene film between nip rolls, and pressing both surfaces of the above obtained sheet or film under a pressure of at least 5 kg/cm$^2$ while heating at a temperature of 155° to 160° C., by the use of a metal belt having a surface roughness of not more than 0.1 μm.

Figure 1:
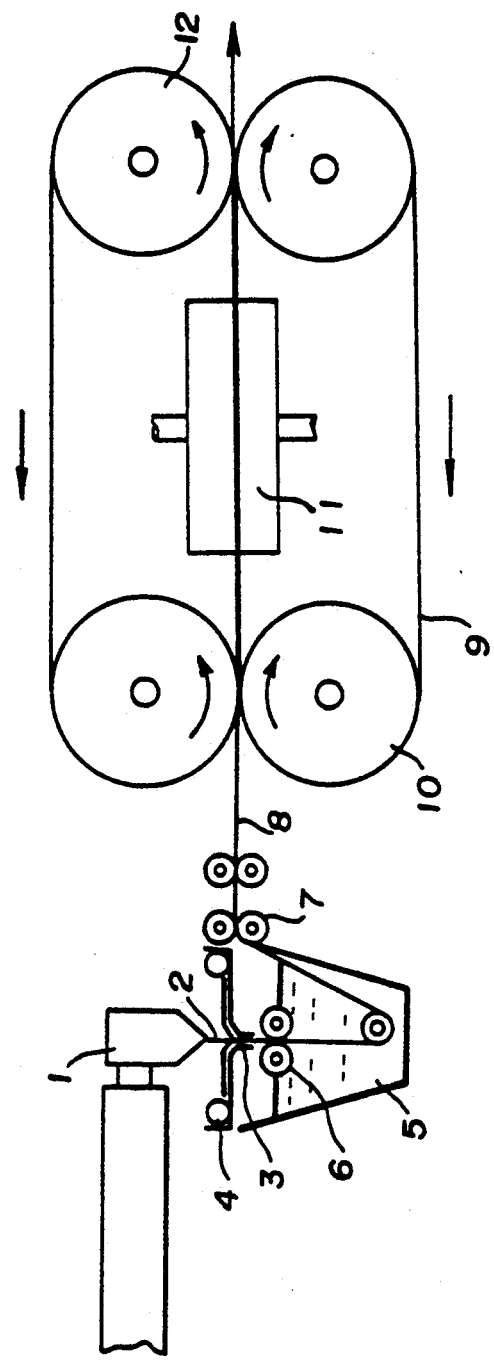
FIG. 1 is a schematic diagram illustrating an embodiment of an apparatus for use in the practice of the process of the present invention.

1: T-die
2: Polypropylene resin in a film form
3: Slit
4: Upper water bath
5: Lower water bath
6: Nip rolls
7: Take-off rolls
8: Polypropylene sheet or film
9: Metal belt
10: Heating rolls
11: Hydraulic press
12: Cooling rolls
13: Unwinding reel stand (Unwinding reel stand of sheets or films for preparation of laminate)
14: Sheet or film

DETAILED DESCRIPTION OF THE INVENTION

As the polypropylene resin for use in production of sheets, or films in accordance with the process of the present invention, a propylene homopolymer, at least one crystalline propylene-based copolymer, and a mixture thereof can be used.

The term "sheet or film" as used herein includes a multi-layer sheet or film". In addition, sheets or films containing a nucleating agent, e.g., silica, talc, para-tertiary butyl benzoate, aluminum, dibenzylidene sorbitol, or fine powder of a high melting point resin, or a petroleum resin, a terpene resin, a cumarone resin, or the like, and those obtained using a propylene starting material which has been heat-treated with an organic peroxide can be used.

The process of the present invention will hereinafter be explained with reference to the accompanying drawings.

FIG. 1 is a diagram illustrating an embodiment of the apparatus for use in the practice of the process of the present invention.

First, a polypropylene resin 2 in a film form which has been extruded in a molten state from a T-die 1 is introduced into a slit 3 through which cooling water is flowing.

The slit 3 is formed in conjunction with an upper water bath 4 which is located below the T-die 1. The length of the slit 3 is usually in a range of 5 to 100 mm; it is preferably shorter.

In the upper water bath 4, the water at a position where the film-formed polypropylene resin 2 is introduced, is required to flow, and the water level should be made as low as possible. Generally the water level is preferably less than 7 mm. If the water level is more than 7 mm, boiling spots, haze spots and curling occur in the resulting sheet, and undesirably the total haze is in a range of 25 to 28%.

Since the cooling water flowsdown from the upper water bath 4, the film-formed polypropylene resin 2 is cooled by the cooling water when it passes through the slit 3.

That is, the cooling water flows in parallel along the both sides of the film-formed polypropylene resin 2, thereby efficiently cooling the polypropylene resin 2.

The flow rate of the cooling water is desirably near the running speed of the film-formed polypropylene resin 2.

Two or more-stage slits can be used, if necessary. In the case of such multi-stage slits, a special consideration is not necessarily required to pay to the control of the water level and so forth in connection with the second stage slit or the subsequent stage slit.

The film-formed polypropylene resin 2 which has been cooled in the aforementioned manner, is then sent to a lower water bath 5 where it is passed between nip rolls 6 and formed into a sheet or film. The thickness of the sheet or film is preferably not more than 0.5 mm. If the thickness of the sheet or film is more than 0.5 mm, the internal haze is deteriorated, which is undesirable.

That is, in the lower water bath 5, the nip rolls 6 of the half immersed type that the lower portion of the roll is dipped in water, is usually provided as illustrated in the drawings. The nip roll 6 is used to press the film-formed polypropylene resin 2 and to transfer thereto the mirror surface of the roll before the cooling water flowing in the inside of the slit 3 produces a turbulent flow.

The film-formed polypropylene resin 2 leaving the nip rolls 6 of the half immersed type is cooled with the cooling water in the lower water bath 5 and then pulled by the take-off roll 7.

The temperature of the cooling water is preferably low and more preferably not more than 10° C. An aqueous solution containing calcium chloride may be used, if necessary.

It is preferred to produce a sheet or film which is improved in the internal haze as much as possible in the aforementioned manner.

A polypropylene resin sheet or film 8 pulled by the take-off rolls 7 is pressed on both sides thereof while heating by the use of a metal belt 9.

More particularly, as illustrated in the drawings, the both sides of the polypropylene resin sheet or film 8 is pressed while heating by the use of a pair of metal belts 9 heated with a heating roll 10. This heat pressing treatment provides the sheet surface with high gloss. In particular, in accordance with the present invention, the heat pressing treatment is conducted in surface contact condition by the use of a pair of metal belts 9 heated with the heating roll 10, and thus there is obtained an excellent sheet.

The metal belt 9 is subjected to surface finishing treatment such that the surface roughness is not more than 0.1 μm and preferably not more than 0.02 μm.

The metal belt 9 is usually made of SUS, carbon steel or titanium alloy, and preferably made of SUS.

The metal belt 9 is usually an endless belt having a thickness of about 0.8 mm. The endless metal belt 9 is usually operated at a relatively high speed of from 18 to 36 m/min.

Pressing the both sides of the polypropylene resin sheet or film 8 with the metal belt 9 is usually carried out by the use of a hydraulic press 11 as illustrated in the drawings. In addition, a roller-type press can be used, if necessary.

The pressing pressure in the above treatment is usually at least 5 kg/cm² and preferably from 10 to 30 kg/cm². If the pressing pressure is less than 5 kg/cm², a sheet or film excellent in transparency and surface gloss cannot be obtained.

In this pressing treatment, the polypropylene resin sheet or film 8 is passed through the heating roll 10, and it is then pressed by the use of the metal belt 9 while heating at a temperature of 155° to 160° C.

If the temperature of the polypropylene resin sheet or film 8 is less than 155° C., a sheet or film excellent in transparency and surface gloss cannot be obtained.

On the other hand, if the temperature of the polypropylene resin sheet or film 8 is more than 160° C., the sheet or film melts and sticks to the metal belt 9, which is undesirable.

The polypropylene resin sheet or film 8 subjected to the pressing treatment is usually cooled by the use of a cooling roll 12.

After cooling, the polypropylene resin sheet or film 8 is wound on a winding roll. From the point of view of preventing curling, it is preferred that prior to winding, annealing is applied using a heating roll, for example. In this case, the heating temperature is usually 80° to 130° C. and preferably 110° to 130° C.

Figure 2:
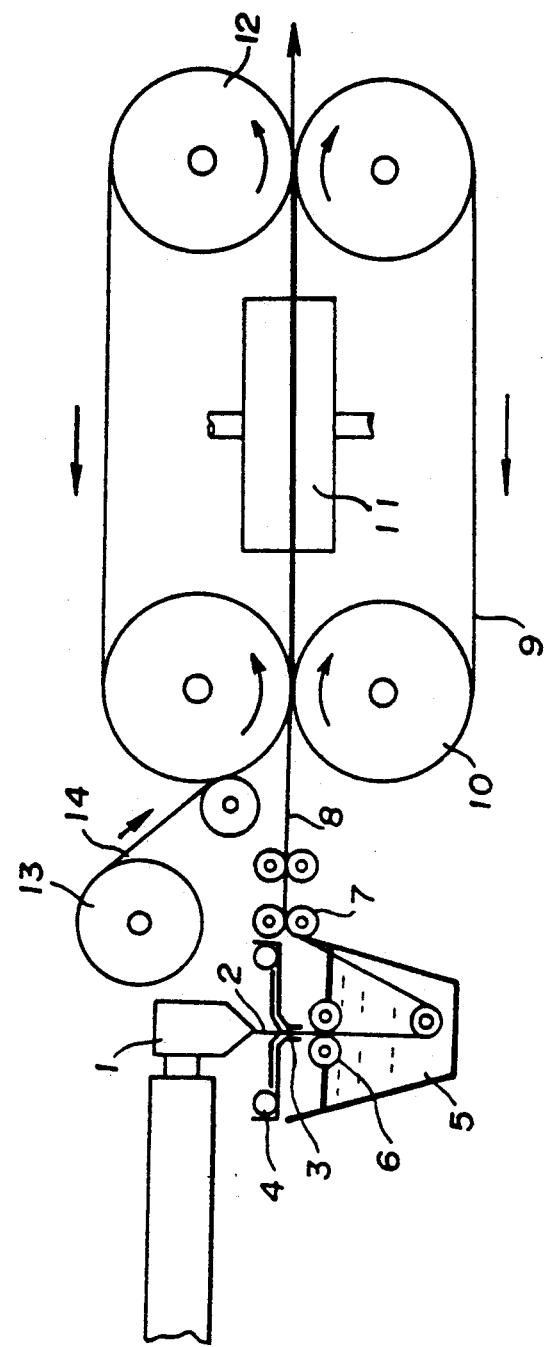
FIG. 2 is a schematic diagram illustrating another embodiment of the apparatus for use in the practice of the process of the present invention.

Although the present invention is explained above referring to a single layer sheet or film, it is not limited thereto; by the use of an apparatus shown in FIG. 2, a thick laminate sheet can be produced.

That is, a sheet or film separately subjected to cooling treatment by the aforementioned water cooling method, or a sheet or film 14 subjected to a cooling treatment by the aforementioned cooling method and wound on the unwinding reel stand (unwinding reel stand of sheets or films for preparation of laminate) 13 is unwound, and laminated on the polypropylene resin sheet or film 8 pulled by the take-off roll 7. Thereafter, in the same manner as explained referring to the apparatus shown in FIG. 1, a polypropylene resin laminate having excellent transparency can be produced.

In accordance with the cooling method of the present invention, a sheet or film of a polypropylene resin which is unstretched and is excellent in transparency and surface gloss can be obtained.

Furthermore, the sheet or film obtained is good in transparency and surface gloss even when it is thick.

In accordance with the process of the present invention, even if the film-forming speed is high, a sheet or film having excellent transparency can be obtained.

Furthermore, in the sheet or film obtained, gel and fish eye are not prominent, and the sheet or film is excellent in heat moldability.

Therefore the sheet or film obtained according to the process of the present invention is suitable for use in wrapping of foodstuffs, medicines and so forth. Moreover, the sheet or film can be used as a material for heat molding such as pressure forming.

The present invention is described in greater detail with reference to the following examples.

EXAMPLE 1

A polypropylene resin sheet was produced by the use of the apparatus shown in FIG. 1.

A polypropylene resin (density 0.91 g/cm³, melt index 2.0 g/10 min, Idemitsu Polypro F-200S (trade name)) was extruded at a resin temperature of 280° C. by the use of a T-die extruder (extruder diameter 120 mm, L/D=28, die width 500 mm, die lip clearance 1 mm).

A molten resin film 2 as extruded above was introduced into a slit 3 (width 3 mm) in which cooling water was flowing. Then, after being passed through a nip roll 6 (diameter 80 mm) of the half immersed type provided in a lower water bath 5, the molten resin film 2 was cooled with cooling water in the lower water bath 5, and pulled with a take-off roll 7.

Then, with a pair of metal belts 9 heated to a predetermined temperature by the use of a heating roll 10 (the metal belt 9 was an endless belt made of SUS, which had a surface roughness of 0.01 μm and a belt thickness of 0.8 mm; the temperature of the heating roll 10 is shown in Table 1; and the temperature of the cooling roll 12 was set at 40° C.), a polypropylene resin sheet or film 8 was pressed from both sides thereof under a pressure as shown in Table 1 by the use of a hydraulic press 11 to obtain a polypropylene resin sheet.

Operating conditions and the results are shown in Table 1.

EXAMPLE 2

A two-layer polypropylene resin laminate sheet having a total thickness of 0.6 mm (0.3 mm×2) was produced in the same manner as in Example 1 except that the apparatus shown in Table 2 was used and the processing was conducted under the conditions shown in Table 1.

Operating conditions and the results are shown in Table 1.

EXAMPLE 3

A three-layer polypropylene resin laminate sheet having a total thickness of 0.9 mm (0.3 mm×3) was produced in the same manner as in Example 2 except that two unwinding reel stands 13 were used and the processing was conducted under the conditions shown in Table 1.

Operating conditions and the results are shown in Table 1.

COMPARATIVE EXAMPLE 1

A polypropylene resin sheet having a thickness of 0.3 mm was produced in the same manner as in Example 1 except that in place of the pressing treatment using the metal belt 9, an annealing treatment (120° C. roll annealing) was applied.

Operating conditions and the results are shown in Table 1.

COMPARATIVE EXAMPLE 2

A polypropylene resin sheet having a thickness of 0.6 mm was produced in the same manner as in Example 1 except that in place of the pressing treatment using the metal belt 9, an annealing treatment (120° C. roll annealing) was applied, and the line speed was set at 15 m/min.

Operating conditions and the results are shown in Table 1.

EXAMPLE 4

A polypropylene resin sheet having a thickness of 0.6 mm was produced in the same manner as in Example 1 except that after the pressing treatment using the metal belt 9, and annealing treatment (120° C. roll annealing) was applied, and the processing was conducted under the conditions shown in Table 1.

Operating conditions and the results are shown in Table 1.

COMPARATIVE EXAMPLE 3

A polypropylene resin sheet having a thickness of 0.3 mm was produced in the same manner as in Example 1 except that the starting material of Example 1 was extruded in the form of a molten resin film under the extruding conditions of Example 1, air was blown onto the mirror finished roll with an air knife, and the line speed was set at 30 m/min.

Operating conditions and the results are shown in Table 1.

COMPARATIVE EXAMPLE 4

A polypropylene resin sheet having a thickness of 0.3 mm was produced in the same manner as in Example 1 except that a molten resin film was extruded using the starting material of Example 1 and under the extrusion conditions of Example 1, and after blowing air onto the mirror finished roll with an air knife, the pressing treatment using the metal belt 9 was conducted in the same manner as in Example 1, and further the processing was conducted under the conditions shown in Table 1.

Operating conditions and the results are shown in Table 1.

COMPARATIVE EXAMPLE 5

A polypropylene resin sheet having a thickness of 0.6 mm was produced in the same manner as in Example 1 except that a molten resin film was extruded using the starting material of Example 1 and under the extruding conditions of Example 1, and chilled with a touch roll, and the line speed was set at 8 m/min.

Operating conditions and the results are shown in Table 1.

COMPARATIVE EXAMPLE 6

A polypropylene resin sheet having a thickness of 0.3 mm was produced in the same manner as in Example 1 except that the temperature of the heating roll 10 was set at 120° C.

Operating conditions and the results are shown in Table 1.

COMPARATIVE EXAMPLE 7

A polypropylene resin sheet having a thickness of 0.3 mm was produced in the same manner as in Example 1 except that the temperature of the heating roll 10 was set at 165° C. In this case, the sheet melted and stuck to the metal belt 9.

Operating conditions and the results are shown in Table 1.

COMPARATIVE EXAMPLE 8

A polypropylene resin sheet having a thickness of 0.3 mm was produced in the same manner as in Example 1 except that the pressing treatment was conducted at 3 kg/cm$^2$ by the use of hydraulic press 11.

Operating conditions and the results are shown in Table 1.

TABLE 1

| Run No. | Sheet Cooling Method | Thickness of Sheet (mm) | Pressing Temperature (°C.) | Pressing Pressure (kg/cm$^2$) | Speed of Line (m/min) | Thickness (mm) | Haze (%)[1] Total Haze | Haze (%)[1] Internal Haze | Haze (%)[1] External Haze | Surface Gloss[2] |
|---|---|---|---|---|---|---|---|---|---|---|
| Example 1 | Water cooling | 0.3 | 156 | 20 | 36 | 0.3 | 0.9 | 0.6 | 0.3 | 128 |
| Example 2 | Water cooling | 0.3 × 2 | 158 | 20 | 20 | 0.6 | 2.1 | 1.7 | 0.4 | 131 |
| Example 3 | Water cooling | 0.3 × 3 | 159 | 20 | 20 | 0.9 | 2.3 | 2.0 | 0.3 | 132 |
| Comparative Example 1 | Water cooling + annealing | 0.3 | — | — | 36 | 0.3 | 8.2 | 0.7 | 7.5 | 97 |
| Comparative Example 2 | Water cooling + annealing | 0.6 | — | — | 15 | 0.6 | 24.1 | 11.6 | 12.5 | 93 |
| Example 4 | Water cooling + annealing | 0.6 | 160 | 20 | 15 | 0.6 | 13.9 | 12.1 | 1.8 | 131 |
| Comparative Example 3 | Air knife method | 0.3 | — | — | 30 | 0.3 | 36.1 | 17.2 | 18.9 | 117/38[3] |
| Comparative Example 4 | Air knife method | 0.3 | 158 | 20 | 30 | 0.3 | 19.6 | 16.1 | 3.5 | 125/110[3] |
| Comparative Example 5 | Touch roll method | 0.6 | — | — | 8 | 0.6 | 48.5 | 23.2 | 25.3 | 121/73[3] |
| Comparative Example 6 | Water cooling | 0.3 | 120 | 20 | 36 | 0.3 | 15.3 | 5.3 | 10.0 | 95 |
| Comparative Example 7 | Water cooling | 0.3 | 165 | 20 | 36 | | Sticking of the sheet to the belt | | | |
| Comparative Example 8 | Water cooling | 0.3 | 156 | 3 | 36 | 0.3 | 16.1 | 6.2 | 9.9 | 93 |

[1] According to JIS K-7105
[2] According to JIS K-7105
[3] Chill roll side/air knife or touch roll side

What is claimed is:

1. A process for producing a polypropylene resin sheet or film which comprises
   (a) introducing a polypropylene resin in a film form, which has been extruded from a T-die in a molten state, into a slit through which cooling water is flowing,
   (b) passing the polypropylene resin film between nip rolls of the half immersed type, said nip rolls in contact with a lower water bath, and
   (c) pressing between a pair of metal bolts the obtained sheet or film from both sides thereof under a pressure of at least 5 kg/cm$^2$, while heating at a temperature of 155° to 160° C., said metal belts having a surface roughness of not more than 0.1 μm.

2. The process as claimed in claim 1, wherein the polypropylene is a propylene homopolymer, crystalline propylene-based copolymer, or a mixture thereof.

3. The process as claimed in claim 1, wherein the flow rate of the cooling water is near the running speed of the polypropylene resin in a film form.

4. The process as claimed in claim 1, wherein the metal belt has a surface roughness of not more than 0.02 μm.

5. The process as claimed in claim 1, wherein the pressing pressure is from 10 to 30 kg/cm$^2$.

6. The process as claimed in claim 2, wherein the metal belt has a surface roughness of 0.02 μm and the pressure is 10 to 30 kg/cm$^2$.

7. The process as claimed in claim 6, wherein the slit has a length of 5 to 100 mm.

8. The process as claimed in claim 7, wherein the cooling water flows into an upper water bath having a water level less than 7 mm through the slit and the cooling water flows parallel to the polypropylene resin film into the lower water bath.

9. The process as claimed in claim 8, wherein the sheet or film has a thickness of not more than 0.5 mm.

10. The process as claimed in claim 9, wherein the cooling water is at a temperature of not more than 10° C.

11. The process as claimed in claim 10, wherein the metal belts move at a speed of 18 to 36 m/minute.

* * * * *